(12) United States Patent
Prochnau et al.

(10) Patent No.: US 12,372,736 B2
(45) Date of Patent: Jul. 29, 2025

(54) DEVICE FOR MOUNTING SPHERICAL OPTICAL COMPONENTS

(71) Applicant: tooz technologies GmbH, Aalen (DE)

(72) Inventors: Jens Prochnau, Oberkochen (DE); Jörg Pütz, Aalen (DE); Wolfgang Singer, Aalen (DE)

(73) Assignee: tooz technologies GmbH, Aalen (DE)

( * ) Notice: Subject to any disclaimer, the term of this patent is extended or adjusted under 35 U.S.C. 154(b) by 558 days.

(21) Appl. No.: 17/701,256

(22) Filed: Mar. 22, 2022

(65) Prior Publication Data

US 2022/0214518 A1 Jul. 7, 2022

Related U.S. Application Data

(63) Continuation of application No. PCT/EP2020/075664, filed on Sep. 14, 2020.

(30) Foreign Application Priority Data

Sep. 30, 2019 (DE) .................. 10 2019 006 980.3

(51) Int. Cl.
G02B 7/02 (2021.01)
(52) U.S. Cl.
CPC ............. G02B 7/021 (2013.01); G02B 7/023 (2013.01)
(58) Field of Classification Search
CPC ........ G02B 7/023; G02B 7/026; G02B 7/022; G02B 7/021; G02B 7/02
See application file for complete search history.

(56) References Cited

U.S. PATENT DOCUMENTS

| | | | |
|---|---|---|---|
| 6,873,418 B1 * | 3/2005 | Howey | G01J 11/00 356/451 |
| 2003/0081331 A1 | 5/2003 | Abe | |
| 2009/0324292 A1 * | 12/2009 | Oda | G02B 7/022 399/206 |
| 2016/0178865 A1 * | 6/2016 | Ochi | G03B 11/045 359/825 |

FOREIGN PATENT DOCUMENTS

| | | |
|---|---|---|
| DE | 10 2017 214 319 A1 | 2/2019 |
| JP | 2013225038 A * | 10/2013 |
| RU | 2 599 598 C1 | 10/2016 |

OTHER PUBLICATIONS

JP2013225038 (Year: 2013).*

(Continued)

*Primary Examiner* — Ricky L Mack
*Assistant Examiner* — Journey F Sumlar
(74) *Attorney, Agent, or Firm* — Walter Ottesen, P.A.

(57) ABSTRACT

The disclosure relates to a device for mounting two spherical optical components. The device includes a first holder, having a receptacle for a first optical element with a first spherical convex face with a first radius, and a second holder, having a receptacle for a second optical element with a second spherical optical concave face with a second radius. At least one of the holders has a supporting face with a third radius, and the first holder can be supported on the second holder such that the radii have a common center point when the first optical element is held in the first holder and the second optical element is held in the second holder.

12 Claims, 3 Drawing Sheets

(56) References Cited

OTHER PUBLICATIONS

International Search Report of the European Patent Office dated Dec. 18, 2020 for international application PCT/EP2020/0075664 on which this application is based.
Translation and Written Opinion of the International Searching Authority dated Dec. 18, 2020 for international application PCT/EP2020/0075664 on which this application is based.
Translation and International Preliminary Report on Patentability of the International Bureau of WIPO dated Dec. 18, 2020 for international application PCT/EP2020/0075664 on which this application is based.

* cited by examiner

DEVICE FOR MOUNTING SPHERICAL OPTICAL COMPONENTS

CROSS REFERENCE TO RELATED APPLICATIONS

This application is a continuation application of international patent application PCT/EP2020/075664, filed Sep. 14, 2020 designating the United States and claiming priority from German application 10 2019 006 980.3, filed Sep. 30, 2019, and the entire content of both applications is incorporated herein by reference.

TECHNICAL FIELD

The disclosure relates to a device for mounting two spherical optical components.

BACKGROUND

It is known to align optical components to be joined in all three spatial directions independently of one another. For example, when producing a cemented group of two lens elements, a melting cement is distributed on one of the surfaces to be joined. The two lens elements are joined together and trapped air bubbles are squeezed out by moving the lens elements relative to one another. The optical axes of the lens elements are then aligned with one another. However, the thickness of the cementing gap between the surfaces of the lens elements cannot be accurately reproduced. Furthermore, highly accurate positioning of the lens elements in the direction of the course of the optical axis is very difficult: a lateral displacement can simultaneously result in a change in distance due to the curvature of the surfaces.

Document RU 2 599 598 C1 discloses a device for setting a spherical holder for an optical element. The device is used for setting the optical element in an optical resonator. In the device, the optical element is held in a spherical, convex holder. The spherical convex holder lies in a spherical-concave mount. The holder is connected to the mount via four adjusting screws, which are offset from one another by 90° on the outer edge. By setting the adjusting screws, the holder can be moved on the spherical surfaces in the mount and a desired state of adjustment can thus be set. The set state of adjustment is permanently secured via a non-shrinking adhesive, which is inserted into an annular groove of the mount.

SUMMARY

It is an object of the disclosure to provide a device for mounting spherical components in order to adjust two spherical optical components geometrically accurately and at a defined distance from one another and to mount them. The distance should be reproducible and optionally settable.

The aforementioned object can, for example, be achieved by a device for mounting spherical optical components. The device includes a first holder, with a mount/receptacle for a first optical element having a first spherical convex surface with a radius $R_1$ and a second holder with a mount/receptacle for a second optical element having a second spherical optical concave surface with a radius $R_2$. At least one of the holders has a bearing surface with a radius $R_3$ and the first holder can be borne on the second holder in such a way that the radii $R_1$, $R_2$, $R_3$ have a common center point when the first optical element has been received in the first holder and the second optical element has been received in the second holder.

The radii $R_1$, $R_2$, $R_3$ are preferably dimensioned such that a gap establishes a defined distance between the optical surface of the first element and the optical surface of the second element.

It goes without saying that, while maintaining the effects according to the disclosure, the radius $R_1$ may be concave and the radius $R_2$ may be convex.

Due to the fact that the spherical surfaces and the bearing surface(s) are arranged concentrically, displacement around the common center point of these surfaces is impeded and only relative displacements of the elements around this center point are possible.

With this type of bearing arrangement, the optical elements or their optical axes can be positioned in relation to one another (within the limits of the relative adjustability of the holders in relation to one another), without the risk that such a positioning movement could adversely affect the amount of the distance between the spherical surfaces of the optical elements determined by the radii $R_1$, $R_2$, $R_3$. The device according to the disclosure thus allows optical elements to be positioned in relation to one another very much more easily and accurately than has hitherto been customary in the prior art.

The positioning can take place in particular for the purpose of aligning two optical elements with one another and then adhesively bonding them to form a substrate composite.

The bearing surfaces of the holders are preferably arranged outside a central area of the holders in which the optical elements are placed.

In a first embodiment, the bearing surface is in the form of a spherical cap.

In a second embodiment, the bearing surface is produced by a three-point support.

The optical elements can be received in the holder via a generated vacuum.

Alternatively, the optical elements can be fixed to the holder via a spring clamp.

Advantageously, the distance between the optical surface of the first element and the optical surface of the second element can be set.

In a first embodiment, adjusting screws in one of the holders are arranged at the periphery outside the central area in which the optical element is placed and act on the bearing surface of the other holder.

In a second embodiment, the adjusting screws in one of the holders are located at the periphery inside the central area in which the optical element is placed and act on the optical element.

Preferably provided for determining a defined distance between the optical elements is a measuring system, which is set up for determining a central thickness and thus for determining the distance between the optical surfaces of the optical elements. In this way, the process of joining and positioning the optical elements can be checked, controlled on an open-loop basis and, if necessary, controlled on a closed-loop basis.

With the setup according to the disclosure, it is possible to position and join two optical elements in a series-like process. With the aid of the device according to the disclosure, an advantageous spherical bearing arrangement of the components in relation to one another can be realized, with very much more accurate and easy mounting of the optical elements being possible.

BRIEF DESCRIPTION OF THE DRAWINGS

The invention will now be described with reference to the drawings wherein.

DESCRIPTION OF THE PREFERRED EMBODIMENTS

Figure 1:
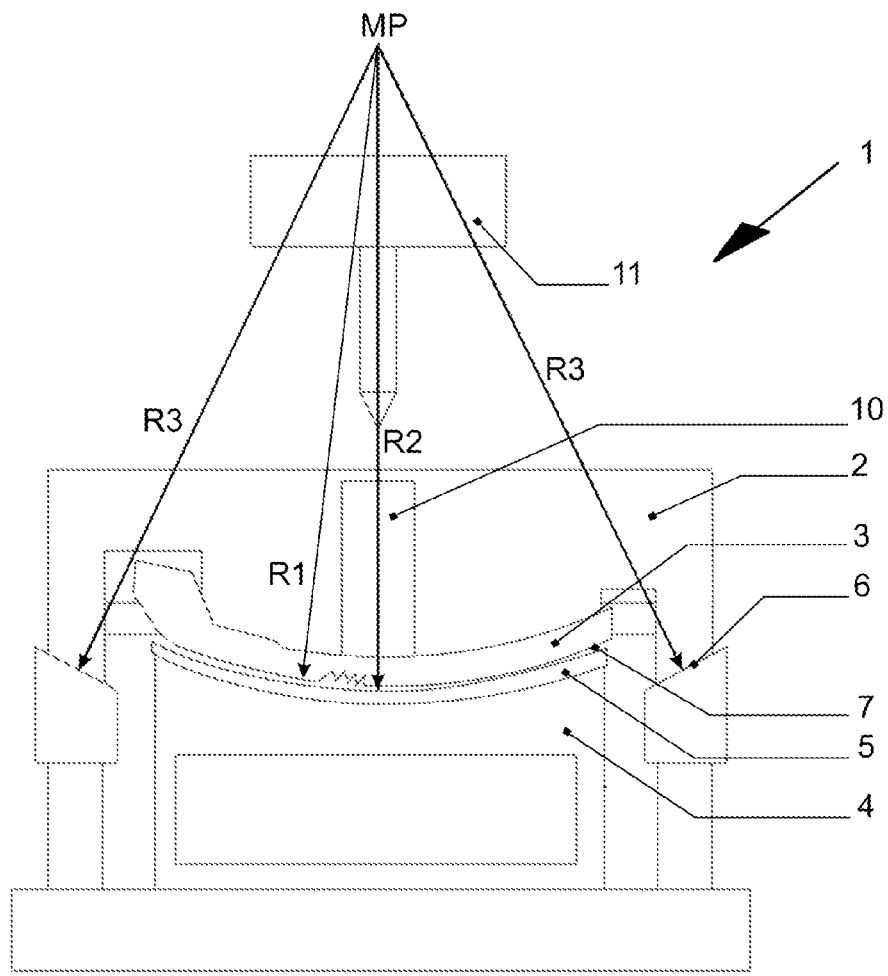
FIG. 1 shows a setup of a device according to the disclosure for the mounting of spherical components.

FIG. 1 shows the setup of the device for mounting spherical components 1. A first holder 2 receives a first optical element 3 in such a way that a spherical optical surface of the optical element 3 with the radius R1 is freely accessible. In the example, this optical surface is convex. A second holder 4 receives a second optical element 5 in such a way that a spherical optical surface of the second optical element 5 with a radius R2 is freely accessible. In the example, this optical surface is concave.

The first holder 2 has at the periphery outside its central area in which the optical element 3 is placed a bearing surface 6, which is formed convexly with a radius R3. Furthermore, the second holder 4 likewise has at the periphery outside the central area in which the optical element 5 is placed a bearing surface 6, which however is formed concavely, likewise with the radius R3.

The second holder 4 is arranged at the bottom in such a way that the optical surface of the second optical element 5 is exposed in the upward direction. The first holder 2 with the received optical element 3 is positioned with its exposed optical surface over the exposed optical surface of the second optical element 5. The position of the optical surfaces of the two optical elements 3 and 5 is set to a predetermined distance by the bearing surfaces 6 of the holders 2 and 4, so that a defined gap 7 (for example of 1 μm or 5 μm or 20 μm or 50 μm or 100 μm) between the optical surfaces is realized.

It is essential that the radii R1 and R2 of the optical surfaces of the optical elements 3 and 5 and the radius R3 of the bearing surfaces 6 of the holders 2 and 4 have a common center point MP. If the holders 2 and 4 are placed one on top of the other, as described, the optical surfaces of the optical elements 3 and 5 and the bearing surface 6 assume a coaxial position in relation to one another. A movement of the optical elements 3 and 5 in the radial direction is thus impeded and the distance between the optical surfaces is defined by the gap 7. Therefore, only a rotational movement or a displacement of the optical elements 3 and 5 in relation to one another on the radius R3 of the bearing surfaces 6 is possible.

FIG. 1 also shows by way of example the possibility of using a measuring system 11 to determine the size of the gap 7, which corresponds to the distance between the optical surfaces. Provided for this purpose in the center of the first holder 2 is a hole 10, by which the distance of the optical elements 3 and 5 from one another, which is also referred to as the central thickness, can be determined with the measuring system 11. With the measuring system 11 for determining the central thickness, the process of joining and positioning two optical elements 3 and 5 can be checked, controlled on an open-loop basis and, if necessary, controlled on a closed-loop basis. Such a joining process is helpful in particular when positioning a film on a spectacle lens of data glasses. The gap 7 between the first optical element 3, in the example the spectacle lens, and the second optical element 5, in the example of the film, can be produced with an accuracy of less than 5 μm.

Figure 2:
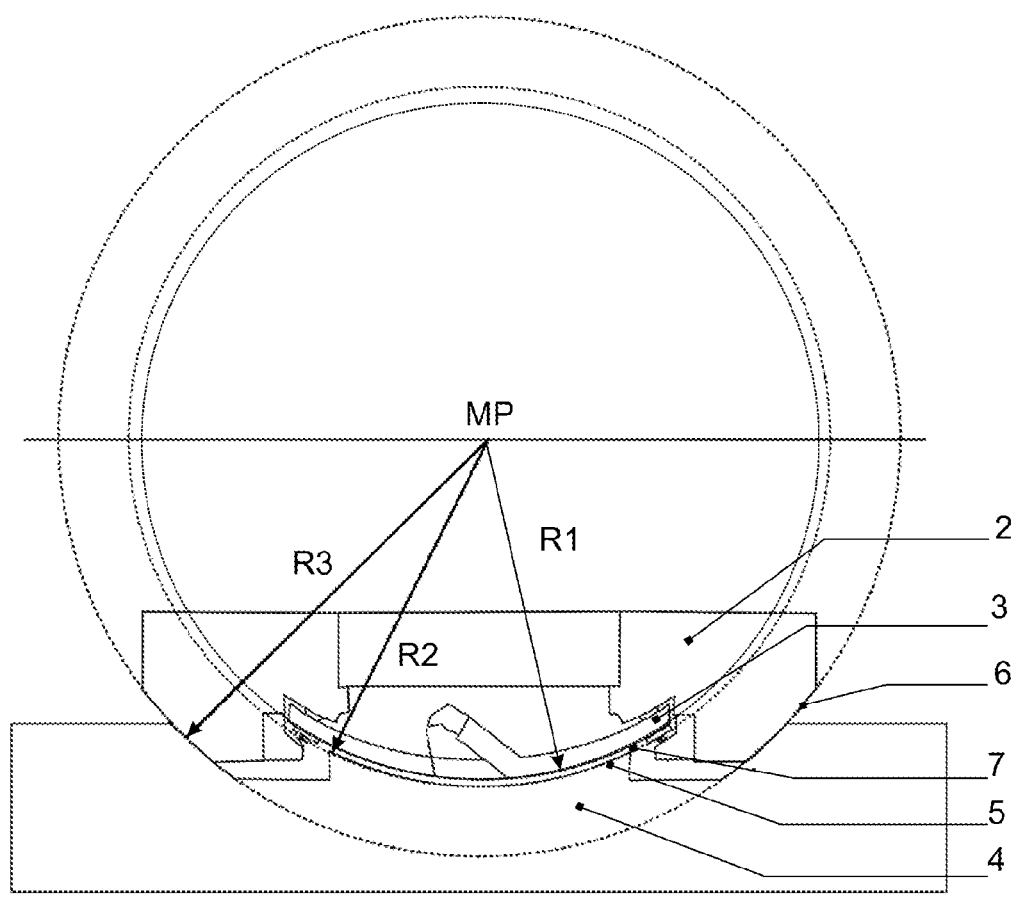
FIG. 2 shows a further setup of a device according to the disclosure for the mounting of spherical components.

FIG. 2 shows the concentric setup of the device according to FIG. 1 in a clearer way. The radius R1 of the optical surface of the first optical element 3, the radius R2 of the optical surface of the second optical element 5 and the radius R3 of the bearing surfaces 6 of the first and second holders 2 and 4 have the common center point MP. In the example, the first optical element is the lens of data glasses and the second optical element 5 is a thin film that rests on the second holder 4. Furthermore, another way of holding the first optical element 3 in the first holder 2 is shown in FIG. 2.

Figure 3:
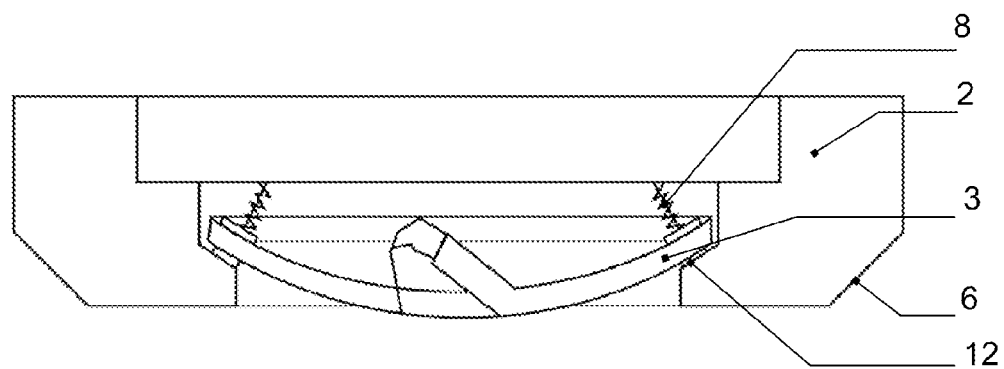
FIG. 3 shows a first detail of a device according to the disclosure (spring holder of an optical element)

FIG. 3 illustrates the holding shown in FIG. 2 of the first optical element 3 in the first holder 2. The first optical element 3 is pressed with a spring clamp 8, which acts on an edge of a concave optical surface of the first optical element 3, against contact points 12, which act on the convex optical surface of the first optical element 3. For example, the contact points 12 are three V-grooves, which are arranged at an angle of 120 degrees and in each of which a ball is fixed. The spherical surfaces form the bearing surface 6.

Figure 4:
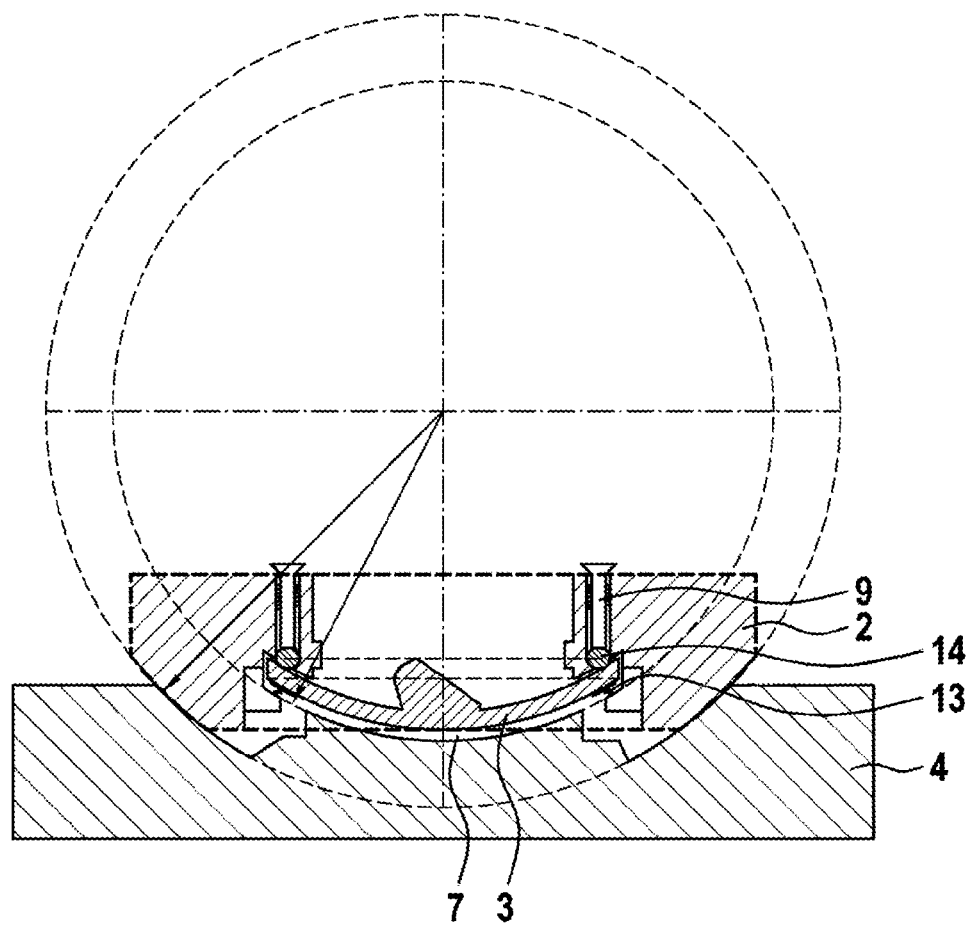
FIG. 4 shows a second detail of a device according to the disclosure (adjusting screws which act on an optical element)

FIG. 4 shows the device for mounting spherical components 1 according to FIGS. 1 and 2 with a possibility for adjusting the size of the gap 7 via adjusting screws 9. The adjusting screws 9 act on the edge of the concave optical surface of the first optical element 3 via balls 14. Compression springs 13, which are arranged at the edge of the convex optical surface of the first optical element 3, press the first optical element 3 against the adjusting screws 9.

The size of the gap 7 can be set by an adjustment of the adjusting screws 9.

Figure 5:
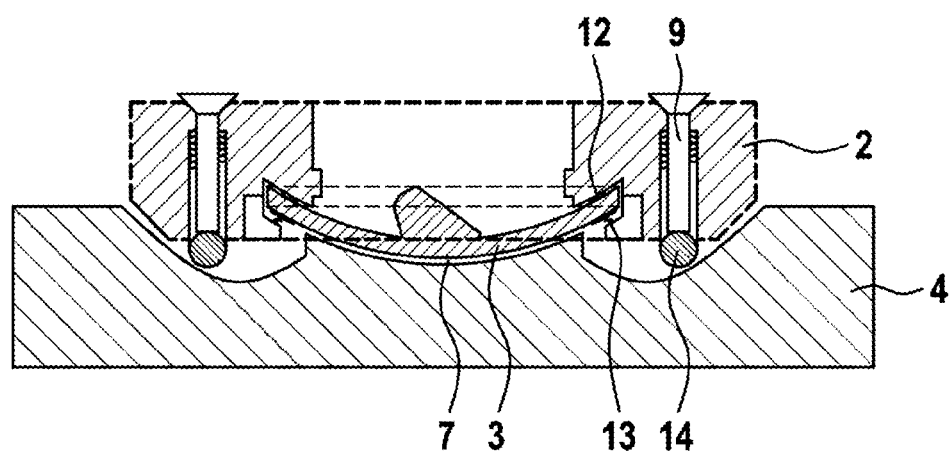
FIG. 5 shows a third detail of a device according to the disclosure (adjusting screws which act on a holder).

FIG. 5 shows a second variant for setting the size of the gap 7. In this example, the adjusting screws 9 act on the bearing surface 6 of the second holder 4 via balls. Here, too, the size of the gap 7 is set by an adjustment of the adjusting screws 9. A further variant for holding the first optical element 3 is also shown in FIG. 5. In this example, the concave optical surface is pressed by a spring clamp 8, which acts on the convex optical surface, against contact points 12 of the first holder 2. FIG. 5 shows that the first optical element is fixed by compression springs 13, which are arranged at the edge of the convex optical surface. The compression springs 13 press the first optical element 3 against contact points 12, which are arranged on the edge of the concave optical surface of the optical element 3.

It is understood that the foregoing description is that of the preferred embodiments of the invention and that various changes and modifications may be made thereto without departing from the spirit and scope of the invention as defined in the appended claims.

LIST OF REFERENCE SIGNS

1 Mounting device
2 First holder
3 First optical element
4 Second holder
5 Second optical element
6 Bearing surface 7 Gap
8 Spring clamp
9 Adjusting screws
10 Hole
11 Measuring system
12 Contact points
13 Compression spring
14 Ball
R1 Radius of a convex optical surface
R2 Radius of a concave optical surface
R3 Radius of bearing surfaces
MP Center point

What is claimed is:

1. A device for mounting spherical optical components comprising:
   a first holder including a mount for a first optical element having a first spherical convex surface with a first radius;
   a second holder including a mount for a second optical element having a second spherical concave surface with a second radius;
   at least one of said first holder and said second holder having a spherical bearing surface with a third radius; and,
   said first holder being configured to be borne on said second holder such that said first radius, said second radius, and said third radius have a common center point when the first optical element has been received in said first holder and the second optical element has been received in said second holder.

2. The device of claim 1, wherein said first holder and said second holder are movable relative to one another in a coaxial manner on said bearing surface.

3. The device of claim 2, wherein said bearing surface has a shape of a spherical cap.

4. The device of claim 2, wherein said bearing surface is produced by a three-point support.

5. The device of claim 1, wherein one of the first optical element and the second optical element can be fixed to a corresponding one of said first holder and said second holder by a vacuum.

6. The device of claim 1, wherein one of the first optical element and the second optical element can be fixed to a corresponding one of said first holder and said second holder by a spring clamp.

7. The device of claim 1 further comprising means for setting an extent of a gap between an optical surface of the first optical element and an optical surface of the second optical element.

8. The device of claim 1 further comprising:
   a plurality of adjusting screws disposed in one of said first holder and said second holder;
   said plurality of adjusting screws being configured to set an extent of a gap between an optical surface of the first optical element and an optical surface of the second optical element; and,
   wherein said plurality of adjusting screws are arranged outside a central area of a corresponding one of said first holder and said second holder in which a corresponding one of the first optical element and the second optical element can be placed and acts on the bearing surface of a corresponding other one of said first holder and said second holder.

9. The device of claim 1 further comprising:
   a plurality of adjusting screws disposed in one of said first holder and said second holder;
   said plurality of adjusting screws being configured to set an extent of a gap between an optical surface of the first optical element and an optical surface of the second optical element; and,
   said plurality of adjusting screws being arranged on a periphery inside a central area in which a corresponding one of the first optical element and the second optical element is placed and acts on the corresponding one of the first optical element and second optical element.

10. The device of claim 1, wherein the first and second optical elements each have an optical surface, the device further comprising a measuring system configured to determine a central thickness and thus determine a distance between the optical surfaces of the first optical element and the second optical element.

11. The device of claim 1 further comprising:
    a plurality of adjusting screws;
    said first optical element having a first concave surface;
    said plurality of adjusting screws being configured to set an extent of a gap between an optical surface of the first optical element and an optical surface of the second optical element; and,
    a plurality of compression springs arranged at an edge of said spherical convex surface of said first optical element, said plurality of compression springs being configured to press said first optical element against said plurality of adjusting screws.

12. The device of claim 11 further comprising:
    a plurality of balls;
    said first optical surface further having a concave surface; and,
    said plurality of adjusting screws being configured to act on an edge of said concave surface via said plurality of balls.

* * * * *